(12) United States Patent
Chen et al.

(10) Patent No.: US 9,604,392 B2
(45) Date of Patent: Mar. 28, 2017

(54) COOLING FIXTURES FOR MOLDED COMPONENTS

(71) Applicant: Emerson Network Power, Energy Systems, North America, Inc., Warrenville, IL (US)

(72) Inventors: Simon Shen-Meng Chen, Palatine, IL (US); Jerome Maloney, Sugar Grove, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 1075 days.

(21) Appl. No.: 13/649,605

(22) Filed: Oct. 11, 2012

(65) Prior Publication Data
US 2014/0103579 A1    Apr. 17, 2014

(51) Int. Cl.
*B29C 71/00* (2006.01)
*B29C 35/16* (2006.01)
*B29K 23/00* (2006.01)

(52) U.S. Cl.
CPC ...... *B29C 35/16* (2013.01); *B29C 2035/1658* (2013.01); *B29K 2023/065* (2013.01)

(58) Field of Classification Search
CPC ................... B29C 35/16; B29C 2035/1658
USPC ............................................. 264/237
See application file for complete search history.

(56) References Cited

U.S. PATENT DOCUMENTS 3,250,841 A * 5/1966 Reinhart ............... B29C 47/003
156/229

* cited by examiner

*Primary Examiner* — Joseph S Del Sole
*Assistant Examiner* — John Robitaille
(74) *Attorney, Agent, or Firm* — Harness, Dickey & Pierce, P.L.C.

(57) ABSTRACT

A cooling fixture for molded components includes a support surface, at least two brackets coupled to the support surface, and at least one roller having a central axis. The roller is coupled between the brackets for rotating about its central axis and is positioned for contacting a portion of a molded component and rotating about its central axis as necessary to align the molded component and substantially inhibit gouging of the molded component when the molded component is placed in the cooling fixture for cooling. Additional cooling fixtures and related methods are also disclosed.

16 Claims, 5 Drawing Sheets

COOLING FIXTURES FOR MOLDED COMPONENTS

FIELD

The present disclosure relates to cooling fixtures for molded components.

BACKGROUND

This section provides background information related to the present disclosure which is not necessarily prior art.

One challenge with molding large open ended components is maintaining dimensional stability across a span of the component after it is removed from the mold and cools. While some molded component materials have properties that are beneficial for certain applications, some materials also have large shrinkage factors during cooling which creates difficulty in maintaining dimensional stability of the component during cooling. For this reason, wooden blocks or frames are commonly used to maintain the dimensions of molded components during cooling.

SUMMARY

This section provides a general summary of the disclosure, and is not a comprehensive disclosure of its full scope or all of its features.

According to one aspect of the present disclosure, a cooling fixture for molded components includes a support surface, at least two brackets coupled to the support surface, and at least one roller having a central axis. The at least one roller is coupled between the brackets for rotating about the central axis. The at least one roller is positioned for contacting a portion of a molded component and rotating about its central axis as necessary to align said portion of the molded component and substantially inhibit gouging of the molded component when the molded component is placed in the cooling fixture for cooling.

According to another aspect of the present disclosure, a method of using a cooling fixture having at least one roller for cooling a molded component includes removing a molded component from a mold and placing the molded component in the cooling fixture for cooling. The molded component is placed with the at least one roller contacting a portion of the molded component and rotating as necessary to align said portion of the molded component without substantially gouging the molded component.

According to yet another aspect of the present disclosure, a cooling fixture for molded components includes a support surface, at least two brackets coupled to the support surface, and at least a first support and a second support extending between the brackets. A first end of the first support is configured to be selectively coupled to one of the brackets at any one of a plurality of locations for adjusting an angle between the first support and said one of the brackets.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-E are top views of several example cooling fixtures according to the present disclosure.

DETAILED DESCRIPTION

Figures 1A, 1B:
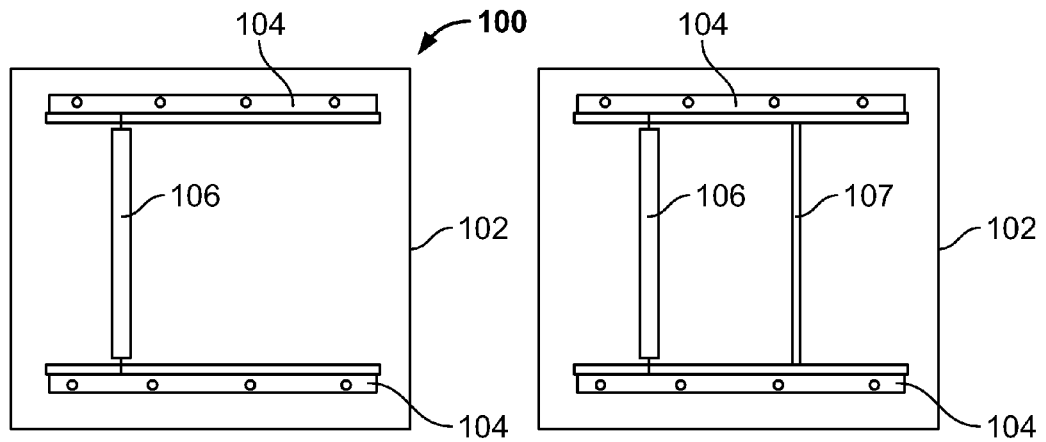

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A cooling fixture according to one example embodiment of the present disclosure is illustrated in FIG. 1A and is indicated generally by reference number 100. As shown in FIG. 1A, the cooling fixture 100 includes a support surface 102 and two brackets 104 coupled to the support surface. The cooling fixture 100 also includes a roller 106 coupled between the brackets 104 for rotating about its central axis. The roller 106 is positioned for contacting a portion of a molded component and rotating about its central axis as necessary to align the portion of the molded component and substantially inhibit gouging of the molded component when the molded component is placed in the cooling fixture 100 for cooling.

Although the roller 106 is the only component positioned between the brackets 104 in the cooling fixture 100 of FIG. 1A, additional components may also be included. For example, FIG. 1B illustrates a cooling fixture having a frame member 107 extending between the brackets 104, parallel to the roller 106. The frame member 107 may be used to position one edge of a molded component as the molded component is placed in the cooling fixture, and the roller 106 may be used to align another edge of the molded component. In other embodiments, more than one frame member 107 may be employed.

Figures 1C, 1D:
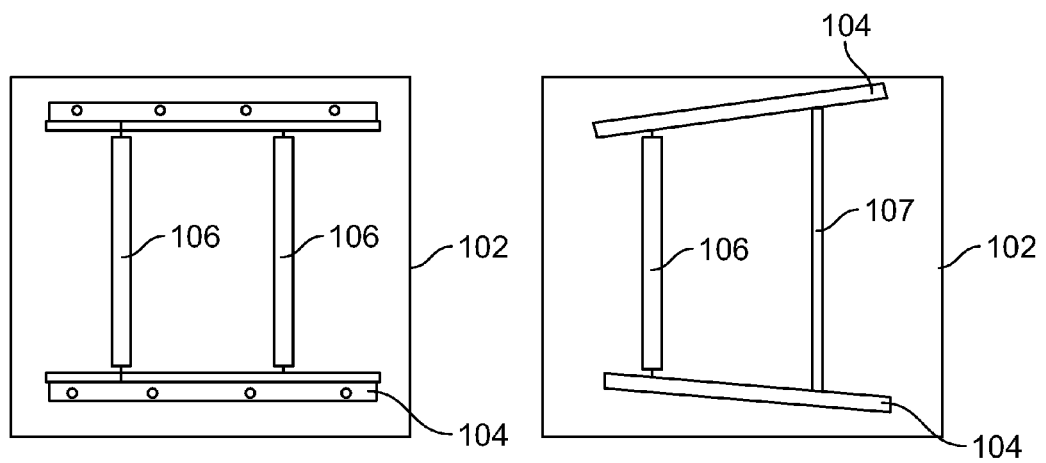

FIG. 1C illustrates a cooling fixture having two rollers 106. In other embodiments, more than two rollers 106 and/or one or more frame members may also be included. In some embodiments, including the example embodiment shown in FIG. 1C, the rollers 106 may be identical to one another.

As shown in FIGS. 1A-1C, the brackets 104 extend parallel to one another. Alternatively, the brackets 104 may extend in non-parallel directions. For example, FIG. 1D illustrates a cooling fixture having a roller 106, a frame member 107, and brackets 104 extending in non-parallel directions.

Figure 1E:
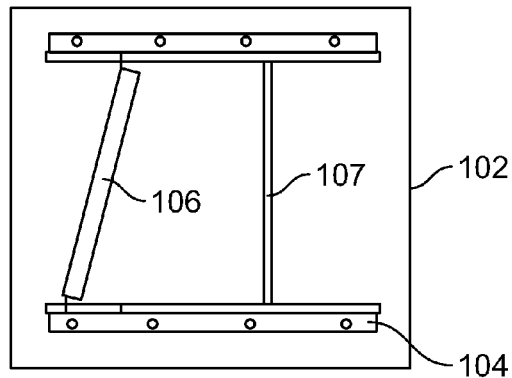

Similarly, each roller 106 may extend in a perpendicular direction relative to the brackets 104 as shown, e.g., in FIGS. 1A-1C. Alternatively, one or more rollers 106 may extend at an oblique angle, rather than a right angle, relative to one or more brackets 104. One example of this is shown in FIG. 1E.

In the various embodiments disclosed herein, the rollers 106 and/or the frame members 107 may be coupled to the brackets 104 in fixed positions. Alternatively, and more preferably, the positions of the rollers 106 and/or the frame members 107 may be adjustable to accommodate molded components or various sizes and shapes, to facilitate placement or removal of molded components from a given fixture, etc. For example, opposite ends of the roller(s) 106 and/or the frame member(s) 107 may have spring biased pins that can be selectively inserted through one of multiple holes in the brackets 104 for mounting the roller(s) and/or the frame member(s) 107 at desired locations and orientations. Alternatively, the roller(s) 106 and/or the frame member(s) 107 may be coupled to the brackets at desired positions through a sliding interaction or other suitable means.

Additionally, it should be noted that the teachings of this disclosure are not limited to cooling fixtures having one or more rollers. On the contrary, any of the rollers 106 shown in FIGS. 1A-1E may be replaced with another type of support that does not rotate about its central axis. For example, each roller 106 may be replaced with a non-rotatable support having at least one end configured to be selectively coupled to one of the brackets 104 at one of multiple possible locations for adjusting an angle between the support and the bracket. Preferably, the positions of both ends of the non-rotatable support are configured to be selectively coupled to the brackets 104 at multiple different locations for accommodating molded components of various sizes and shapes.

The brackets 104 may be coupled to the support surface 102 in any suitable manner, e.g., using hardware, adhesives, welds, etc. The support surface 102 may be formed of any suitable material including wood, metal, plastic, etc.

Figure 2:
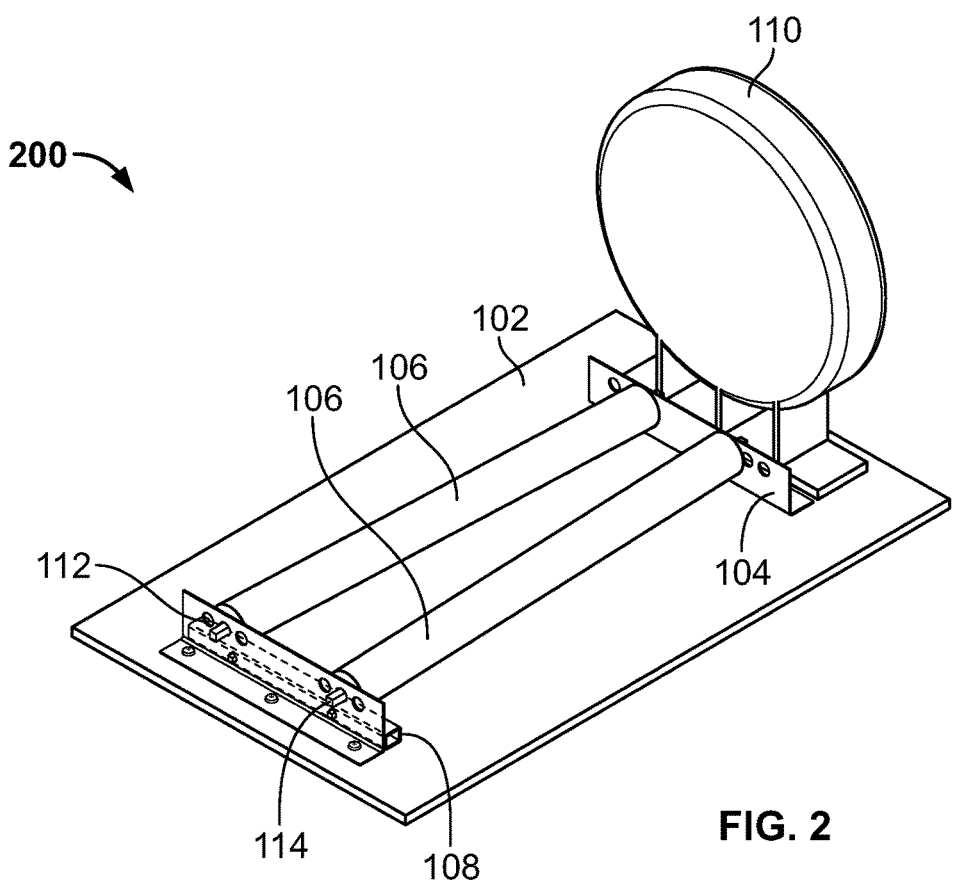
FIG. 2 is a front isometric view of a cooling fixture according to another example embodiment of the present disclosure.
Figure 3:
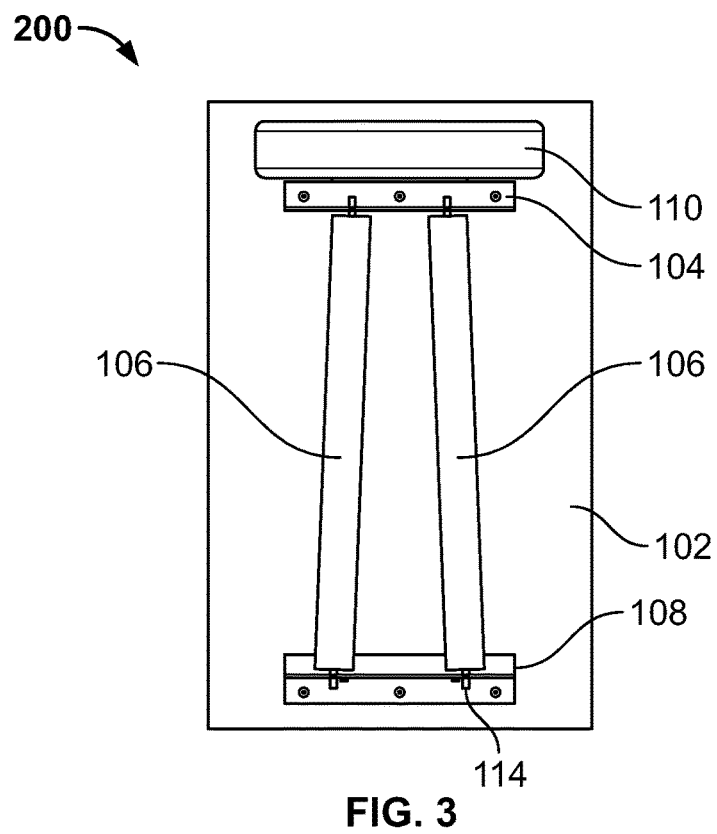
FIG. 3 is a top view of the cooling fixture of FIG. 2.

FIG. 2 illustrates a cooling fixture 200 according to another example embodiment of the present disclosure. As shown in FIG. 2, the cooling fixture 200 includes a support surface 102, two brackets 104 and two rollers 106. Additionally, and as best shown in FIG. 3, the cooling fixture 200 includes an alignment bar 108 adjacent (and extending parallel) to one of the brackets 104. Much like the frame members 107 discussed above, the alignment bar 108 may be used to align a portion (e.g., an edge) of a molded component when the molded component is placed in the cooling fixture 200.

In the example of FIG. 2, the alignment bar 108 is a rectangular tube. Alternatively, the alignment bar may have another suitable shape (e.g., a cylindrical shape) for aligning a portion of the molded component. The alignment bar 108 may be mounted to one of the brackets 104, as shown in FIG. 3, or to the support surface 102. Alternatively, the alignment bar 108 may not be mounted to anything, and may rest on the support surface 102 and/or adjacent to one of the brackets 104. Further, while only one alignment bar 108 is shown in the example of FIGS. 2 and 3, multiple alignment bars may be used in any given embodiment of this disclosure.

The cooling fixture 200 of FIG. 2 also includes an air moving device 110 for accelerating cooling of a molded component when the molded component is placed in the cooling fixture. The air moving device 110 accelerates cooling by moving air across interior and/or exterior surface(s) of the molded component. The air moving device 110 may be any suitable device capable of moving air, such as a fan. The air moving device 110 may be positioned as desired in any given implementation of these teachings. Although FIG. 2 illustrates only one air moving device 110, one or more additional air moving devices may also be used to further accelerate cooling of molded components.

In the example embodiment shown in FIG. 2, the ends of the rollers 106 are configured for coupling to the brackets 104 at various different positions. The brackets 104 include mounting holes 112 along their lengths. The ends of the rollers 106 include biased pins 114 for engaging the mounting holes 112. The biased pins 114 may be spring-loaded pins that allow an operator to quickly adjust the position of a roller 106 by disengaging the biased pin from its current mounting hole 112, moving the roller to a newly desired position, and releasing the biased pin to engage a different mounting hole at the new position. In this manner, operators may quickly change the position of a roller 106 if a particular application requires a different position, for example, when cooling molded components of different sizes and/or shapes.

Preferably, each roller 106 is adjustable at each end. However, each end of each roller 106 may or may not be adjustable. For example, some embodiments may have rollers 106 that are only adjustable at one end. Alternatively, other embodiments may have one roller 106 that is adjustable and another roller that is not. The ends of adjacent rollers 106 may be coupled to the same or different brackets 104.

In one preferred implementation of the cooling fixture 200 of FIG. 2, the rollers 106 are approximately two feet in length and two inches in diameter, the brackets 104 are angle iron L-brackets having dimensions of 2.25 inches by 1.5 inches by 0.078 inches cut to twelve inch lengths, the alignment bar 108 is approximately one inch by 0.75 inches by 0.109 inches cut to a twelve inch length, and the air moving device 110 is a twelve inch diameter blade, 1/25 HP, 120 VAC fan.

Figure 4:
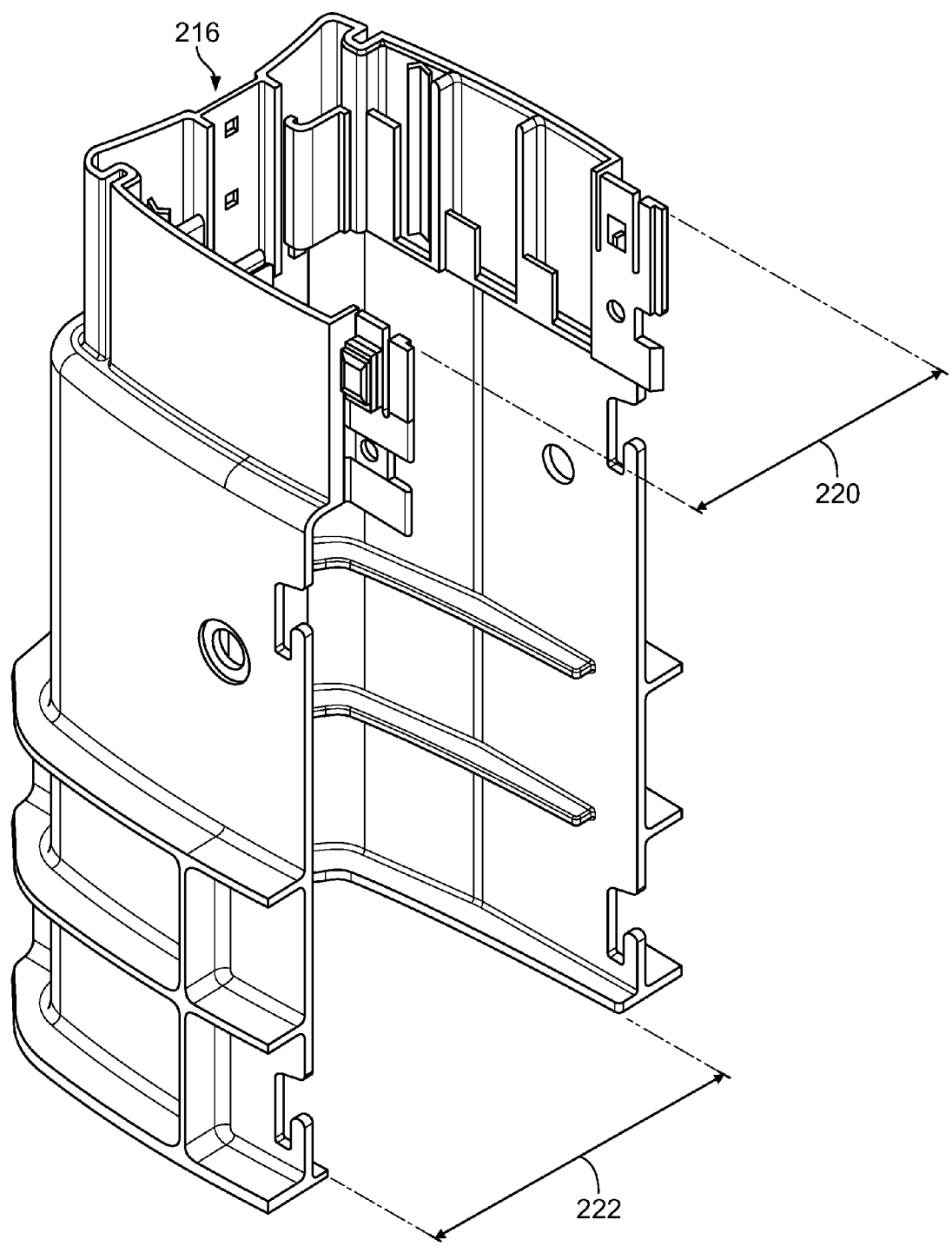
FIG. 4 is a top isometric view of an example molded component.

FIG. 4 illustrates one example of a molded component 216. In this particular example, the molded component 216 is one piece of a two-piece base for a telecommunications equipment pedestal. As should be apparent, however, the teachings of this disclosure are not limited to the example component illustrated in FIG. 4, and can be applied to a wide variety of other molded components. Such components may be formed from any material that may exhibit shrinking or warping during cooling, including thermoplastic materials, polyolefin materials such as polypropylene, high density polyethylene (HDPE), etc.

As shown in FIG. 4, the molded component 216 is open on one side and is substantially U-shaped. Further, the molded component 216 includes a top span dimension 220 and a bottom span dimension 222. In the example of FIG. 4, the bottom span dimension 222 is greater than the top span dimension 220. Of course, other molded components may have more or less span dimensions which may be the same, greater than, or less than one another.

When the component of FIG. 4 is removed from its mold, its natural tendency is for the open end to close or shrink inwardly during cooling, thus causing the top span dimension 220 and the bottom span dimension 222 to be less than their intended values. To address this issue without increasing the amount of time spent in the mold, the molded component 216 can be placed in one of the cooling fixtures of the present disclosure to maintain the top span dimension 220 and the bottom span dimension 222 at their intended values while the component cools.

Figure 5:
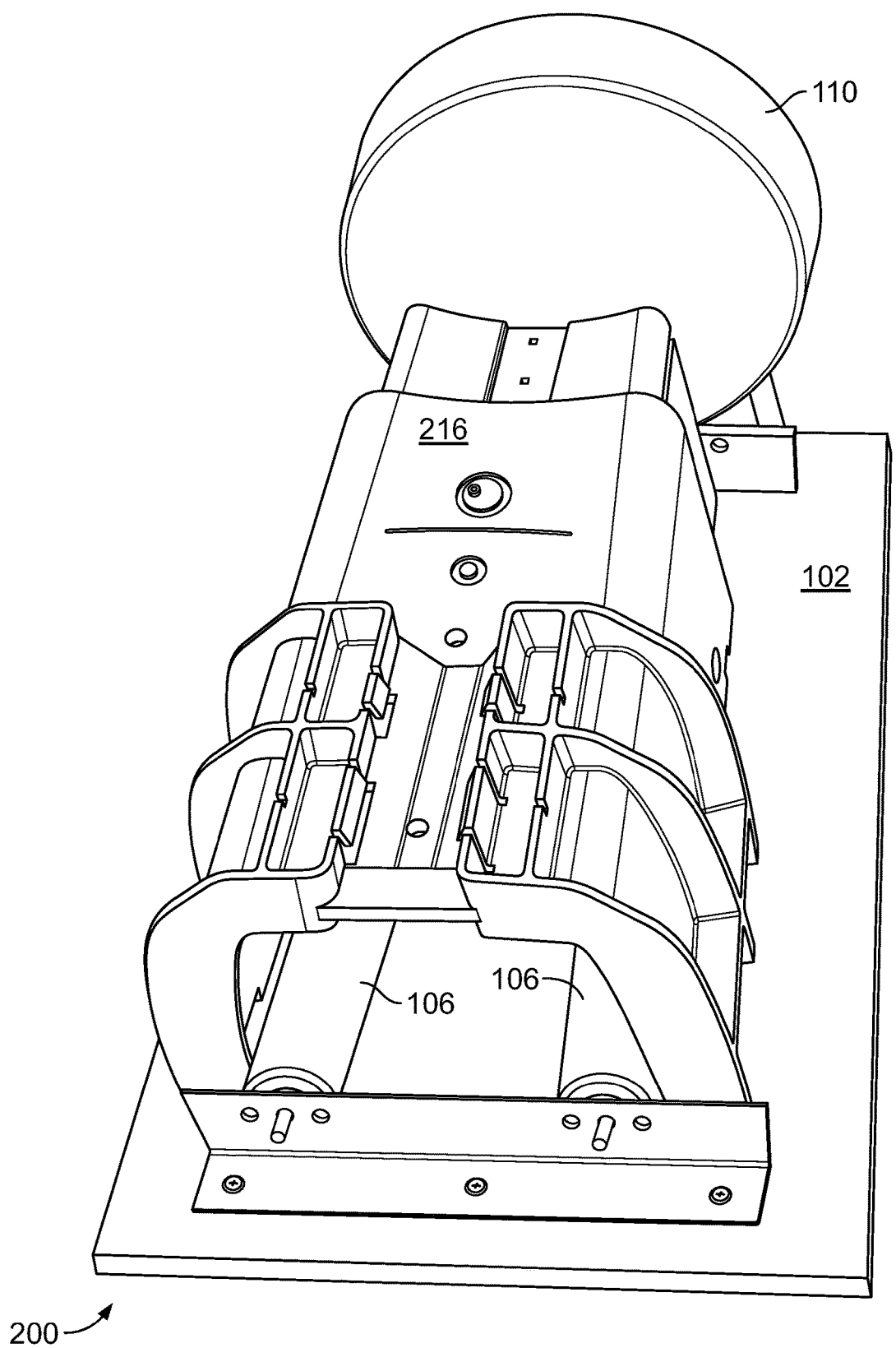
FIG. 5 is a top perspective view of the molded component of FIG. 4 in the cooling fixture of FIG. 2.

For example, and as shown in FIG. 5, the molded component can be placed in the cooling fixture 200 of FIG. 2 for cooling. In that event, the support surface 102 may be inclined so gravity assists in positioning the bottom end of the molded component 216 against the alignment bar 108, and to make it easier for an operator to place the molded component in and remove the molded component from the cooling fixture 200. The positions of the rollers 106 are preferably set such that when the molded component 216 is placed in contact with the rollers, the top span dimension 220 and the bottom span dimension 222 will remain at desired values while the molded component cools. In this example embodiment, adjacent top ends of the rollers 106 are spaced apart to maintain the top span dimension 220 of the molded component 216, while adjacent bottom second ends of the rollers are spaced apart to maintain the bottom span dimension 222 of the component.

As the molded component 216 is positioned on the cooling fixture 200, the rollers 106 contact portions of the molded component and rotate as necessary to align these portions of the molded component with the rollers without substantially gouging the molded component. Additionally, the air moving device 110 is positioned for moving air through the space between the molded component 216 and the support surface 102, and across exterior surfaces of the molded component, with the air moving in a direction from the top end of the molded component toward its bottom end.

One or more parts may be attached to the molded component 216 while it cools in the cooling fixture 200. For example, an operator may add grommets, plugs, etc., to holes in the molded component 216 while it is cooling in the cooling fixture 200. Attaching parts during cooling may reduce the overall assembly time for the molded component 216.

In the example of FIG. 5, the molded component is placed on the cooling fixture 200 with interior surfaces of the molded component 216 contacting outer edges of the rollers 106, such that the rollers are covered by the molded component. In other embodiments, including those involving molded components whose span or other dimensions may expand undesirably during cooling, one or more rollers may be positioned against exterior edges of the molded component for maintaining dimensional stability of the component during cooling.

Figure 6:
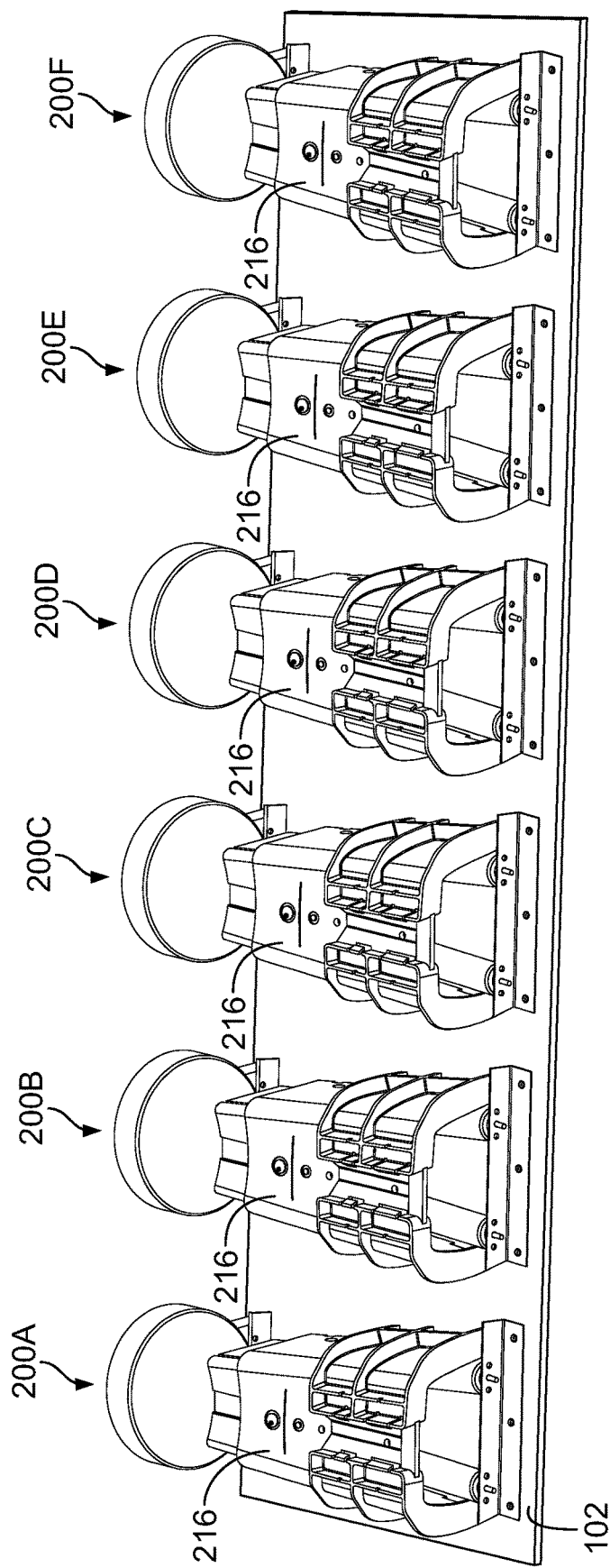
FIG. 6 is a top perspective view of multiple molded components in multiple cooling fixtures according to another example embodiment of the present disclosure.

Additionally, multiple cooling fixtures 200 may be used to cool multiple molded components 216 at the same time. For example, some molds are two cavity molds and produce two molded components 216 at a time. If a cooling period equal to two mold cycles is desired for sufficient cooling to maintain proper span dimensions of a molded component, an assembly of six cooling fixtures 200 may be used, as shown in FIG. 6. Initially, an operator may remove two molded components from a mold during a first mold cycle, and place the two molded components on first and second cooling fixtures 200A, 200B. When the second mold cycle is complete, the operator may remove the next two molded components 216 from the mold and place them on third and fourth cooling fixtures 200C, 200D. When the third molding cycle is complete, the operator may remove another two molded components from the mold and place them on fifth and sixth cooling fixtures 200E, 200F. At this point, the initial two molded components 216 should be sufficiently cooled, allowing the operator to remove them from the first and second cooling fixtures 200A, 200B. This frees up the first and second cooling fixtures 200A, 200B to be used again for another two molded components 216 (e.g., from the fourth mold cycle). This process may be repeated as desired to facilitate efficient cooling during production of multiple molded components 216.

In the example shown in FIG. 6, the six cooling fixtures 200A-F are coupled to the same (i.e., a single) support surface 102. Alternatively, multiple support surfaces can be employed, with one or more cooling fixtures coupled to each support surface.

As should be apparent, the various other cooling fixtures disclosed herein may be used in substantially the same way as the cooling fixtures 200 shown in FIGS. 5 and 6.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of using a cooling fixture having at least one roller for cooling a cavity molded component, the method comprising:
    removing a cavity molded component from a cavity mold; and
    placing the cavity molded component in the cooling fixture for cooling with the at least one roller contacting a portion of the cavity molded component and rotating as necessary to align said portion of the cavity molded component without substantially gouging the cavity molded component.

2. The method of claim 1 further comprising maintaining a plurality of dimensions of the cavity molded component while the cavity molded component cools.

3. The method of claim 2 wherein maintaining includes using a first end of the roller for maintaining a first span dimension of the cavity molded component and a second end of the roller for maintaining a second span dimension of the cavity molded component.

4. The method of claim 1 further comprising attaching at least one part to the cavity molded component while the cavity molded component cools in the cooling fixture.

5. The method of claim 1 wherein the cavity molded component comprises a polyolefin material.

6. The method of claim 5 wherein the polyolefin material is a high density polyethylene (HDPE) material.

7. A method of using a cooling fixture including two rollers for cooling a molded component, the method comprising:
    removing a molded component from a mold, the molded component including a substantially U-shaped portion; and
    placing the molded component in the cooling fixture for cooling by positioning opposite ends of the substantially U-shaped portion in contact with the two rollers and rotating the two rollers as necessary to align said U-shaped portion of the molded component without substantially gouging the molded component.

8. A method of using a cooling fixture having at least one roller for cooling a molded support base for a telecommunications equipment pedestal, the method comprising:
    removing the molded support base for a telecommunications equipment pedestal from a mold; and
    placing the molded support base in the cooling fixture for cooling with the at least one roller contacting a portion of the molded support base and rotating as necessary to align said portion of the molded support base without substantially gouging the molded support base.

9. The method of claim 7, wherein the molded component is a cavity molded component and removing the molded component includes removing the molded component from a cavity mold.

10. The method of claim 8, wherein the molded support base is a cavity molded support base and removing the support base includes removing the support base from a cavity mold.

11. The method of claim 7, wherein the molded component comprises a polyolefin material.

12. The method of claim 11, wherein the polyolefin material is a high density polyethylene (HDPE) material.

13. The method of claim 8, wherein the molded support base comprises a polyolefin material.

14. The method of claim 13, wherein the polyolefin material is a high density polyethylene (HDPE) material.

15. The method of claim 1, wherein the cavity molded component comprises a support base for a telecommunications equipment pedestal.

16. The method of claim 7, wherein the molded component comprises a support base for a telecommunications equipment pedestal.

* * * * *